Figure 1:
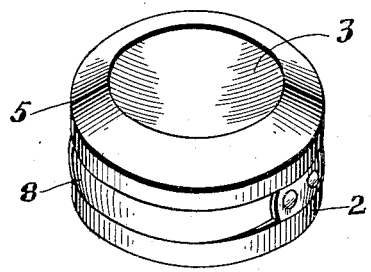

Feb. 11, 1930.                C. A. PERSONS                1,746,902
                              SHOCK ABSORBER
                            Filed Nov. 7, 1927

INVENTOR.
Charles A. Persons,
By his Attorney,

Patented Feb. 11, 1930

1,746,902

UNITED STATES PATENT OFFICE

CHARLES A. PERSONS, OF WORCESTER, MASSACHUSETTS

SHOCK ABSORBER

Application filed November 7, 1927. Serial No. 231,501.

This invention relates to devices adapted to be used under the legs of supports of various kinds to absorb shock or vibration, and will be herein disclosed as embodied in a shock absorber which, while capable of other uses, is designed especially for use under the legs of an automobile seat.

It is the chief object of the invention to devise an article of this character which will reduce substantially the shock and vibration which ordinarily is transmitted through an automobile seat to the occupant, while at the same time being economical to manufacture, convenient to use, and capable of rendering long service.

The nature of the invention will be readily understood from the following description when read in connection with the accompanying drawings, and the novel features will be particularly pointed out in the appended claims.

Figure 2:
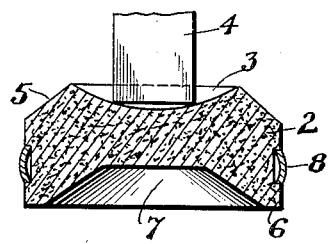

In the drawings,

Figure 1 is a perspective view of a shock absorber embodying the present invention; and Fig. 2 is a vertical, cross-sectional view through the device shown in Fig. 1.

The shock absorber shown comprises a rubber body 2 which preferably is of circular outline. This body is provided with an upper surface which includes a relatively deep central depression or cavity 3 adapted to receive the lower end of a chair leg, or the like, 4. Surrounding this depression is an inclined or tapered margin 5. The lower face of the body includes a flat margin 6 adapted to rest on a floor or other flat surface, this margin surrounding a large central cavity 7 which extends upwardly into the body 2 for a considerable distance. Encircling the body 2 is a metal band 8 which preferably is set into a groove formed in the edge of the body, this band acting as a reinforcement to limit the lateral expansion of the rubber body.

The body 2 should be made of a highly resilient grade of rubber, and when the device is in use it serves to cushion and absorb much of the jolt and disagreeable vibration which otherwise is transmitted through the legs of the seat to the rider. Part of this vibration is absorbed by the cushioning action of the rubber body itself, and the air trapped in the lower cavity 7 appears also to contribute to this result. The cushioning action of the trapped air is obtained by forming, in effect, a dash pot. The band 8 serves to limit the lateral deformation of the rubber body 2 and as the rubber under pressure must yield, the yielding will be downwardly or against the air trapped in the cavity 7. The air then will act as a cushion to absorb, in part, the vibration which otherwise would be transmitted through the legs of the seat to the rider, and the rubber body itself will, of course, absorb an additional part of the vibration.

The device may be conveniently manufactured by molding and vulcanizing the rubber body 2 in a manner well understood by those skilled in this art, and the metal band 8 can then be forced onto the body, the upper tapered surface 5 being of advantage in performing this operation.

While I have herein shown and described a preferred embodiment of the invention, it will be understood that the invention may be embodied in other forms without departing from the spirit or scope thereof.

Having thus described my invention, what I desire to claim as new is:

1. A shock absorber comprising a resilient rubber body having a depression in its upper surface adapted to receive the leg of a chair, or the like, and a cavity in its lower face, said lower face being provided with marginal floor engaging portions, and a band of different material from said body encircling the body between its upper and lower faces and serving to limit the lateral expansion of said body.

2. A shock absorber comprising a resilient rubber body having a depression in its upper surface adapted to receive loosely the leg of a chair, or the like, and a central cavity in its lower face surrounded by a surface adapted to rest on a floor, and a substantially inelastic band encircling said body between its upper and lower faces and limiting the lateral expansion of said body.

3. A shock absorber comprising a resilient rubber body having a depression in its upper surface adapted to receive the leg of a chair, or the like, and a relatively large cavity in its lower face surrounded by a marginal surface adapted to rest on a floor, the edge surface of said body between said faces being grooved, and a metal band located in said groove and serving to limit the lateral expansion of said body.

4. A shock absorber comprising a resilient rubber body of approximately circular outline having a central depression in its upper surface surrounded by a tapered marginal surface, said body having a relatively large central cavity in its lower face surrounded by a flat marginal face, and a substantially inelastic band encircling said body between its upper and lower faces and limiting the lateral expansion of said body.

CHARLES A. PERSONS.